July 25, 1939. W. P. FRANKENSTEIN Re. 21,158

COLLAPSIBLE CARTON

Original Filed Feb. 13, 1936 3 Sheets-Sheet 1

INVENTOR.
WILLIAM P. FRANKENSTEIN
BY Joseph A. Rave
ATTORNEY.

COLLAPSIBLE CARTON

Original Filed Feb. 13, 1936 3 Sheets-Sheet 2

INVENTOR.
WILLIAM P. FRANKENSTEIN,
BY Joseph A. Rave
ATTORNEY.

July 25, 1939. W. P. FRANKENSTEIN Re. 21,158
COLLAPSIBLE CARTON
Original Filed Feb. 13, 1936 3 Sheets-Sheet 3
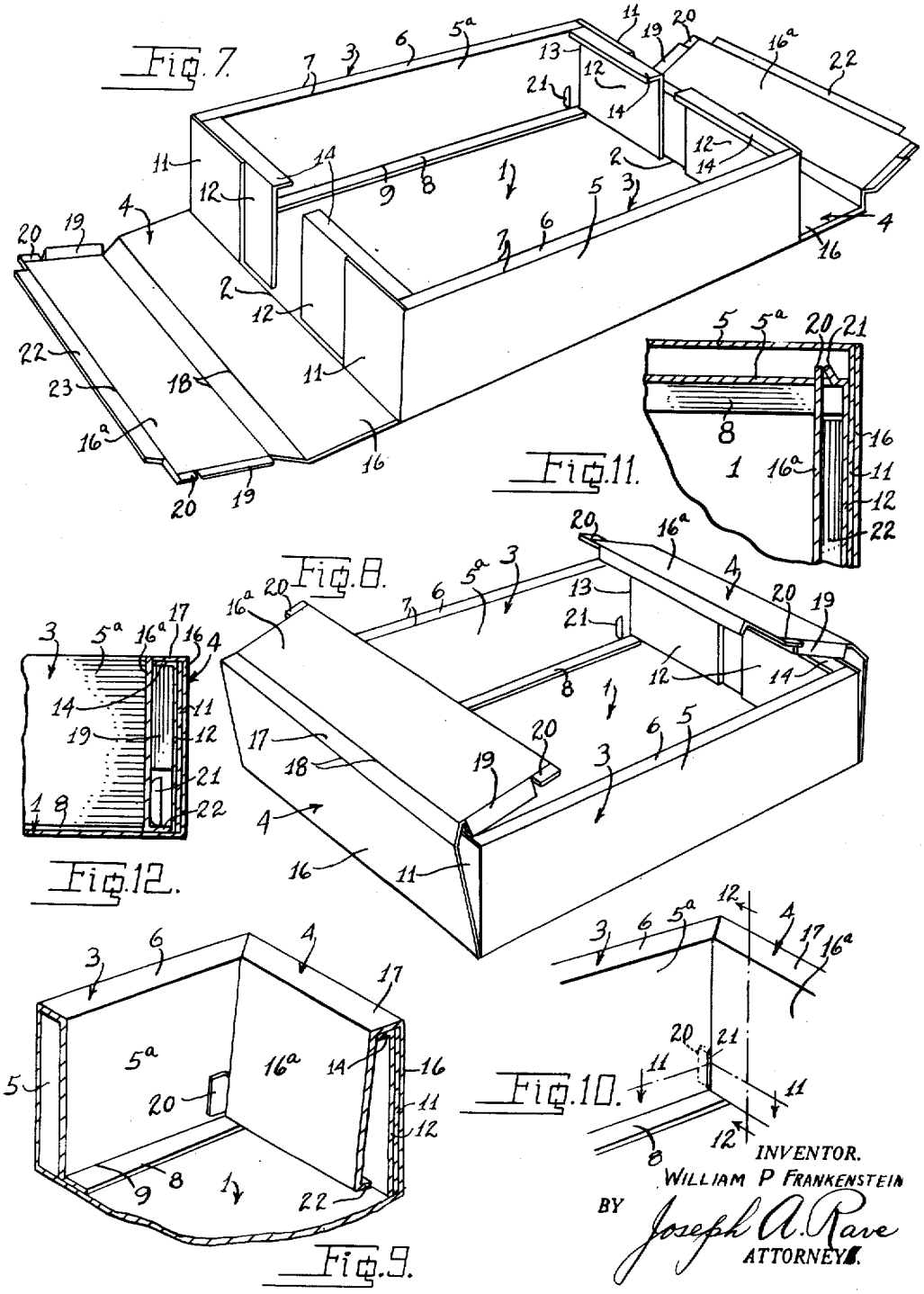
INVENTOR.
WILLIAM P FRANKENSTEIN
BY Joseph A. Rave
ATTORNEY.

Reissued July 25, 1939

Re. 21,158

UNITED STATES PATENT OFFICE 21,158

COLLAPSIBLE CARTON

William P. Frankenstein, Cincinnati, Ohio

Original No. 2,116,513, dated May 10, 1938, Serial No. 63,758, February 13, 1936. Application for reissue August 3, 1938, Serial No. 222,931

10 Claims. (Cl. 229—34)

This invention relates to improvements in collapsible or knock-down boxes for a full display of the contents thereof, the contents being confined therein by a transparent wrapping sheet enveloping the open or face side of the carton or by a windowed slide sleeve as a removable closure for the carton. The carton is of hollow or double wall formation to give a framing width dimension thereto, thereby materially adding to the attractiveness of the package, as well as increasing its strength and cushioning the contents to protect the same against injury in shipping or handling.

An object of the invention is to provide a double or hollow wall, collapsible or knock-down carton which can be easily and conveniently erected, several walls of which are erected by merely swinging the same from their flat, knock-down position to the perpendicular, and locking the same in their erected position in erecting adjoining walls.

Another object of the invention is to provide a double or hollow wall, collapsible or knock-down carton, the double wall structure increasing the strength of the box, cushioning the contents to prevent its injury in shipping or handling, more efficiently packaging the contents against deterioration and spoil, and permitting the use of a lighter weight paperboard material in the manufacture of the carton, bringing about its reduction in cost.

Various other features and advantages will be more fully set forth in a description of the accompanying drawings, in which:

Figure 7 is a perspective view of the carton in a partially erected condition.

Figure 8 is a view similar to Figure 7, showing the same in a further stage of erection.

Figure 9 is a section through a corner of the carton partially erected.

Figure 10 is an inside perspective view of a corner of the carton completely erected.

Figure 11 is a section on line 11—11, Figure 10.

Figure 12 is a section on line 12—12, Figure 10.

Figure 5:
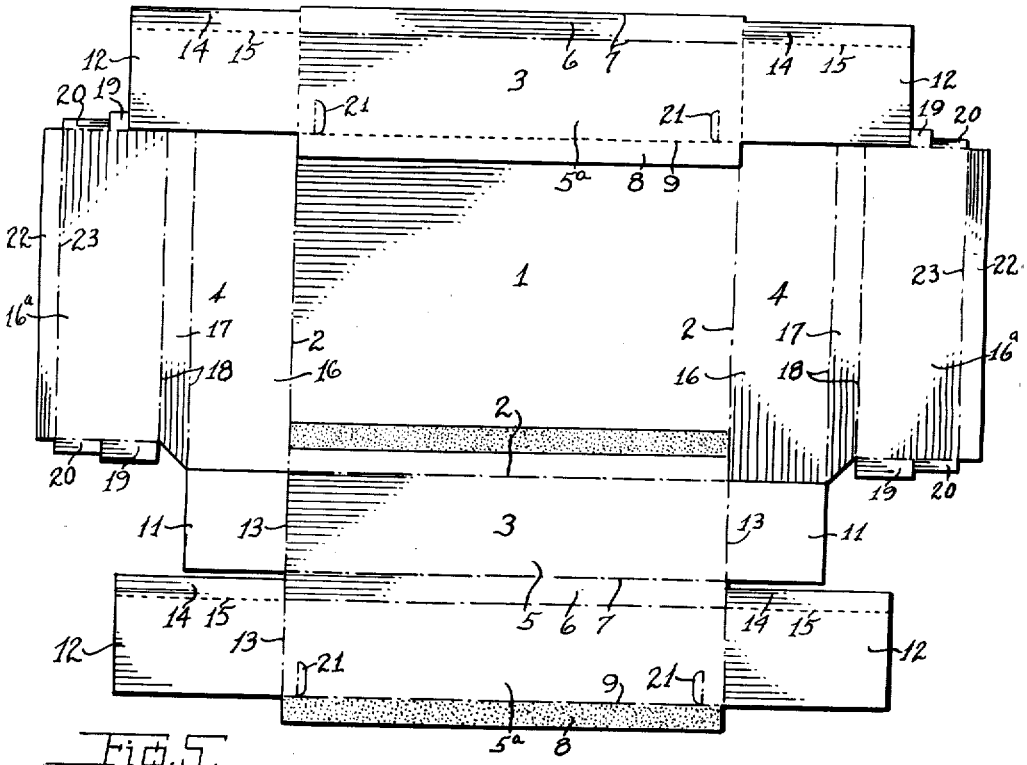
Figure 5 is a plan view of the carton blank with one of the double side walls folded to its knock-down position, with the inner wall thereof at its longitudinal edge adhesively secured to the upper or inner side of the carton bottom.

Referring to the drawings, particularly Figure 5, a carton blank formed of a single sheet of paperboard material is disclosed, died or cut out to a definite configuration, punched and score marked or lined to provide a panel or bottom 1 for the carton and, in the blank, located intermediately thereof and, as illustrated, rectangular, bounded by the score lines 2 and joining with the opposite side walls 3—3 and opposite end walls 4—4.

The opposite side walls 3—3 are of duplicate formation and therefore will be described in the singular, each as a side extension of the panel, subdivided by score lines into a plurality of wall sections, consisting of a pair of companion wall sections, as an outer wall section 5 and an inner wall section 5a in parallel arrangement, joined by an intermediate or connecting wall section 6 of a width dimension defined by a spacing of parallel score lines 7—7 hingedly joining the wall sections 5, 5a, adapting the same, when erected, to provide a double or tubular side wall.

The outer side wall section 5 joins or is in immediate connection with the bottom 1 and folds at an angle thereto on the score line 2, dividing the bottom 1 and outer wall section 5. The outer wall section 5, when the sections are erected, is located at the outer side of the carton, while the inner wall section 5a is at the inner side, over the bottom, to which it is permanently adhesively secured.

The connecting wall section 6, when the wall sections are erected, bridges the same and forms the top face for the double wall. The inner wall section 5a, along its longitudinal extremity, has a pasting flap 8 extended therefrom, folding along a score line 9 dividing the flap from the wall section. The pasting flap, in the manufacture of the box, is permanently adhesively secured to the upper side of the bottom and extends inwardly thereof for convenience in machine pasting and securing. This presents the wall sections 5 and 5a in a knock-down condition of the carton, in a superposed relation with the inner wall section 5a and including the connecting wall section 6, in a plane parallel with the bottom, in an overlapped position thereof, as shown in Figure 5, for one of the double side walls.

The wall sections 5 and 5a, at their opposite longitudinal ends or extremities, are provided with end wall tucking flaps 11—11 and 12—12 respectively. The tucking flaps 11 and 12, for the respective wall sections, are shown relatively of different length, which feature, however, is merely arbitrary. The tucking flaps 11 and 12 fold or bend inwardly in erecting the walls at right angles to the wall sections, of which they form an extension, each along a score line 13.

The tucking flaps 12—12, projecting from the relative opposite ends of the inner wall section 5a, respectively at their inner side or edge, are each provided with a spacing flap 14 longitudinally therewith and foldable along a score line 15 at right angles to the tucking flap, of which they are a part, to extend inwardly of the top edge of the flap in the erected position of the walls and in a parallel relation to the bottom, to serve as a spacer for the wall sections of an end double wall, between which it is tucked. The spacer flaps 14, however, may be eliminated and are not present in some views of the drawings representative of modifications, when the sections of the end walls are not spaced to produce a hollow wall structure and disposed in simulation of a plural ply wall structure.

The opposite double side walls 3—3 are easily erected without any appreciable fingering, by merely swinging the same from their collapsed position horizontally with the bottom upwardly, to a position at an angle to the bottom, whereby the wall sections self-assume their spaced relation to form a hollow wall structure.

The opposite end walls of the carton, as the side walls, are of duplicate formation and therefore will be described in the singular, each as an end extension of the panel, subdivided by score lines into a plurality of wall sections, comprising a pair of wall sections designated according to the relative positions they assume when the carton is erected. Thus are provided an outer wall section 16, immediately joining with the bottom 1, and an inner wall section 16a, of lesser longitudinal dimension than its companion wall section 16 joining therewith by an intermediate connecting wall section 17, divided from the connected wall sections by spaced parallel score lines 18—18, along which the several walls fold respectively in the wall erection.

Figure 1:
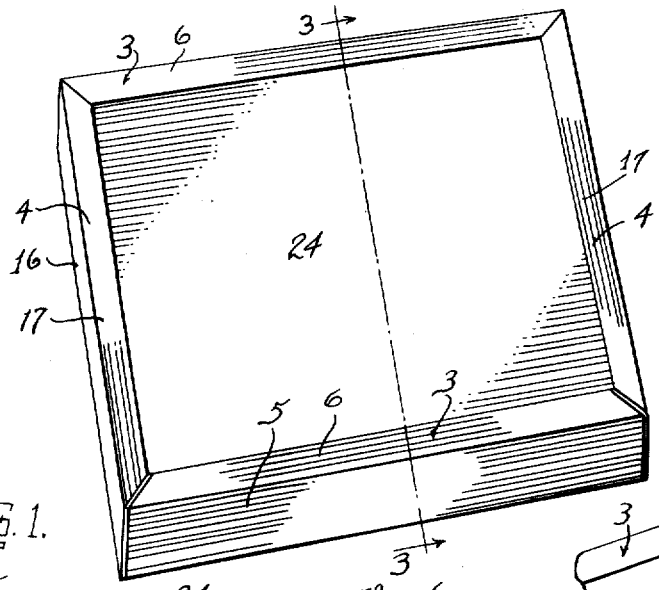
Figure 1 is a perspective view of the improved carton in erected position, with the upper open face side sealed by a slip-in cover.
Figure 2:
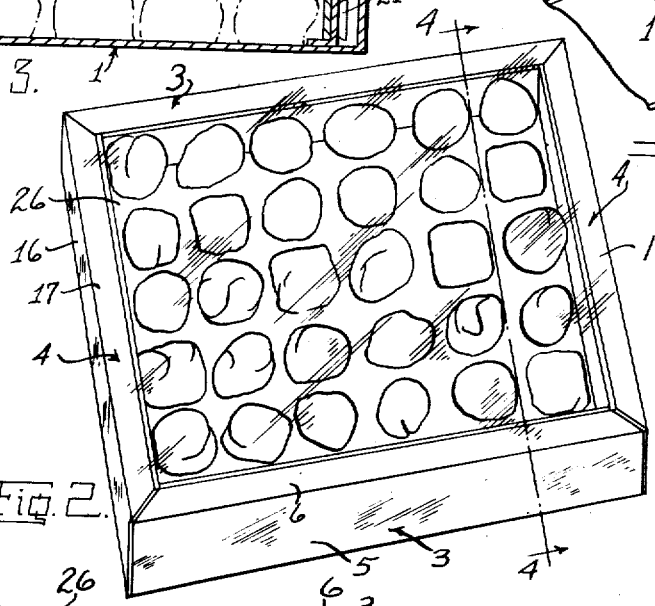
Figure 2 is a perspective view similar to Figure 1 with the carton enveloped with a transparent sheet wrapper for a full view of the contents.

The intermediate or connecting wall section 17, at its opposite longitudinal ends, is cut angularly to give a miter corner joint effect to the top margins or width faces of the hollow walls when the carton is erected, as shown in Figures 1 and 2.

The inner wall section 16, at each of its opposite longitudinal ends, is respectively provided with a pair of flaps 19 and 20. The flap 19 qualifies as a spacer flap for the wall sections 16 and 16a and folds inwardly at right angles to the inner wall section 16a to extend between the inner and outer wall sections 16, 16a and beneath the spacer flap 14 on a tucking flap 12 of a side wall section. The flap 20 provides a locking flap engaging into a slot 21 in an adjoining end of an inner wall section 5a of a double side wall. A notch is cut so that the tailing formed thereby is not completely cut out, this feature being of advantage in bracing the locking flap 20 when engaged into the notch, making the locking connection additionally secure.

The inner wall section 16a, along its longitudinal edge or extremity, is provided with a base spacer flap 22, folded at right angles to the inner wall section 16a, to which it joins along a score line 23, and in an outward direction directly over the bottom 1 to lie between the inner and outer wall sections. The various spacing flaps materially reinforce the double wall structure and limit outward movement of the inner wall section 16a when the wall sections are erected, and, with the aid of the locking flap, offer rigidity to the hollow wall structure.

The flaps act as struts, connecting the inner and outer wall sections, and administer a binding pressure to the locking flaps when engaged into their respective notches. The locking flaps also secure the inner wall section against upward displacement, which in turn prevents outward swing of the side walls sustained in their erected position by the tucking flaps 11 and 12 projected within the hollow of an adjoining end wall.

Figure 13:
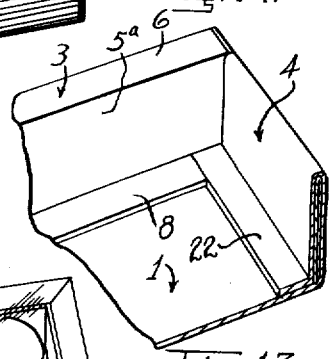
Figure 13 is a central section through an end portion of a modified form of carton.

By omitting the spacer flaps from the several wall sections, the tucking flaps and wall sections can be brought intimately together, as illustrated in Figure 13, thereby forming a plural ply wall, which somewhat simplifies the assembly or erection, and in such case the spacer flap 22 is turned inwardly in edge-abutting contact with an end cross edge of a pasting flap 8.

The carton can be wrapped, closed or enveloped in various ways, several methods being herein disclosed. These methods are selective to meet trade preferences, kinds of goods packed, and carton sizes.

Figure 3:
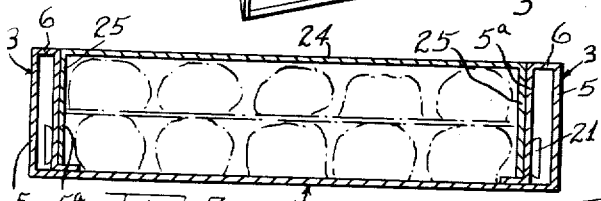
Figure 3 is a section on line 3—3, Figure 1.
Figure 6:
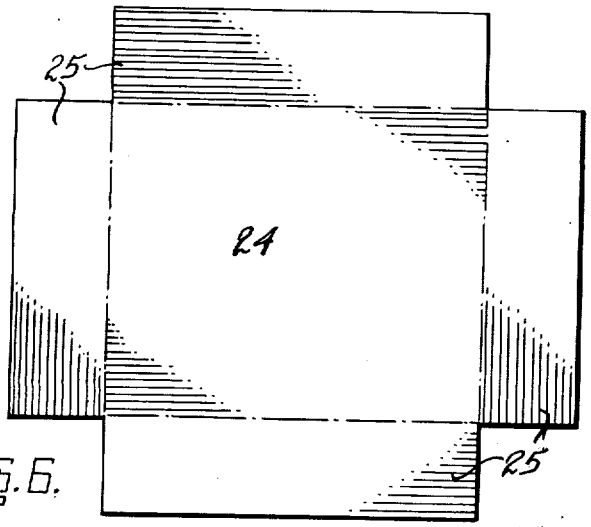
Figure 6 is a plan view of the closure blank employed in sealing the contents of the carton, as illustrated in Figures 1 and 3.

In Figures 1 and 3 the carton is provided with a removable closure 24, illustrated in detail in Figure 6, constituting a single sheet of paperboard material cut to an outline configuration to form a rectangular panel bounded by tucking flaps 25. The tucking flaps are folded at right angles to the panel and the closure applied to the carton by inserting the flaps between the inner side of the walls of the carton and the merchandise, as illustrated in Figure 3. The closure panel is shown solid, although it may contain a windowed opening by cutting an opening in the panel and screening the same with a transparent sheet adhesively secured to the underside of the panel across the opening.

Figure 4:
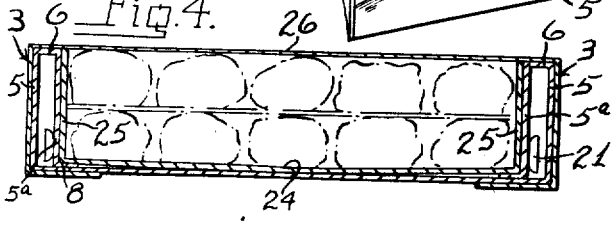
Figure 4 is a section on line 4—4, Figure 2.

Figures 2 and 4 disclose a transparent sheet wrapping 26 as a closure for the carton, which spreads over the open top thereof and about the exterior of the side walls, lapping over the margins of the exterior side of the bottom to which it is adhesively secured. This method, when properly applied, hermetically seals the contents within the carton, as well as furnishes a full view of the contents, or an upper layer therein when plural there packed. It will be observed from Figure 4 that the paperboard closure 24 is utilized as a liner for the carton.

Figure 14:
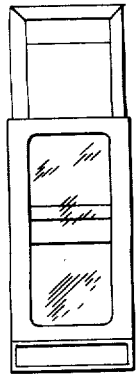
Figure 14 is a perspective view of a modified form of carton closure.

Figure 14 discloses the carton as enclosed by a windowed sleeve, slidably engaged over the carton.

To erect the carton from its flat or knock-down condition, the spacer flaps 14 on the tucking flaps 15 of the double side walls are bent upwardly to a vertical position. In fact, all of the tucking flaps may be initially bent upwardly at one time and prior to folding the walls. The opposite side walls are then pressed upwardly to a perpendicular position and held erect, as by one hand of the operator, or may be inserted into a holding block or cage to allow the use of both hands, in erecting the end walls. The tucking flaps, at one end of the carton, are then turned inwardly or at right angles to the side walls, whereupon the end wall sections are folded upwardly, bringing the inner end wall section 16a inwardly and then in an arc downwardly and outwardly about the tucking flaps 11—12 until the locking flaps 20 are brought into interlocked position with the notches 21.

The extended spacing of the wall sections adds materially to the appearance of the package when viewed from the top open side thereof, providing a marginal border around the contents, available for printing or embellishment in color to increase its esthetic value.

The double wall formation provides an insulating space surrounding the contents, and by wrapping or enveloping the carton with a transparent non-moisture penetrating sheet adhesively sealed, the contents is very effectively protected from the atmosphere, thereby holding the freshness of an edible product packaged therein for a longer period. The double wall structure enables the carton to be manufactured from an exceedingly thin or light-weight paper or cardboard stock, bearing a lower material cost and of ample durability required for the merchandise packed therein. The structure of the package thus makes it permissible to use a light-weight stock having a high surface finish, not commercially available in heavier grades of stock, which would be required for a single wall structure of equal tensile strength. The higher surface finish renders possible the production of higher quality printing or lithographing.

Having described my invention, I claim:

1. A carton made from a single sheet blank of card or paperboard material, comprising, a rectangular panel forming the bottom of the carton, extensions respectively from each side of the rectangular panel, each extension subdivided into sections by parallel scored lines, along which the sections are folded for erecting the same into a hollow wall of spaced inner and outer wall sections, an intermediate wall section joining said inner and outer wall sections, and a flap section joining with the inner wall section for overlying the bottom panel, the flaps for two opposed side walls of the carton permanently secured to the bottom panel and the flaps for the end walls respectively folded to overlie the bottom panel and provide a spacer for the inner and outer wall sections, the inner wall sections for the two opposed end walls of the carton of lesser longitudinal dimensions than their relative outer wall sections, and the intermediate connecting wall section thereof having their opposite ends cut on a bias.

2. A carton made from a single sheet blank of card or paperboard material, comprising, a rectangular panel forming the bottom of the carton, extensions respectively from each side of the rectangular panel, each extension subdivided into sections by parallel scored lines, along which the sections are folded for erecting the same into a hollow wall of spaced inner and outer wall sections, an intermediate wall section joining said inner and outer wall sections, a flap section joining with the inner wall section for overlying the bottom panel, the flaps for two opposed side walls of the carton permanently secured to the bottom panel and the flaps for the end walls respectively folded to overlie the bottom panel and provide a spacer for the inner and outer wall sections, the inner wall sections for the two opposed end walls of the carton of lesser longitudinal dimensions than their relative outer wall sections, and the intermediate connecting wall section thereof having their opposite ends cut on a bias, and tabs at the opposite ends of said inner wall sections of the end walls of the carton, foldable for respectively spacing the inner and outer wall sections when the walls are erected.

3. A carton made from a single sheet blank of card or paperboard material, comprising, a rectangular panel forming the bottom of the carton, extensions respectively from each side of the rectangular panel, each extension subdivided into sections by parallel scored lines, along which the sections are folded for erecting the same into a hollow wall of spaced inner and outer wall sections, an intermediate wall section joining said inner and outer wall sections, a flap section joining with the inner wall section for overlying the bottom panel, the flaps for two opposed side walls of the carton permanently secured to the bottom panel and the flaps for the end walls respectively folded to overlie the bottom panel and provide a spacer for the inner and outer wall sections, the inner wall sections for the two opposed end walls of the carton of less longitudinal dimensions than their relative outer wall sections, the intermediate connecting wall section thereof having their opposite ends cut on a bias, and locking tabs at the opposite ends of said inner wall sections of the end walls of the carton, interlocking with an inner wall section respectively of the side walls of the carton.

4. A carton made from a single sheet blank of card or paper board material, comprising a panel forming the bottom of the carton, extensions from opposite sides of the bottom panel, each extension subdivided into sections by parallel score lines along which the sections are folded for erecting the same into a hollow wall of spaced inner and outer wall sections, an intermediate wall section joining said inner and outer wall section and forming the top for the wall, a flap section joining with the inner wall section and adapted to overlie the bottom panel, means for hingedly securing said flaps to the bottom panel with the hinge lines of said flaps with the inner wall sections spaced inwardly toward one another from the sides of the bottom panel a distance equal to the width of the intermediate wall section or carton wall top, whereby the said side walls of the carton may be assembled from a flat position to an upstanding position, end walls integral with the remaining sides of the bottom panel for completing the walls of the carton, and means for maintaining hollow side walls and end walls of the carton in an upright spaced apart relation.

5. A carton made from a single sheet blank of card or paper board material, comprising a panel forming the bottom of the carton, extensions from opposite sides of the bottom panel, each extension subdivided into sections by parallel score lines along which the sections are folded for erecting the same into a hollow wall of spaced inner and outer wall sections, an intermediate wall section joining said inner and outer wall section and forming the top for the wall, a flap section joining with the inner wall section and adapted to overlie the bottom panel, means for securing said flaps to the bottom panel with the score lines of said flaps with the inner wall sections spaced inwardly toward one another from the sides of the bottom panel a distance equal to the width of the intermediate wall section or carton wall top, whereby the said side walls of the carton may be assembled from a flat position to an upstanding position, tucking flaps at the ends of the inner and outer side wall sections, extensions at the remaining opposite sides of the bottom panel, each subdivided into sections by parallel score lines for providing inner and outer wall sections adapted to be folded on one another with the side wall tucking flaps therebetween, and co-operating means on said side wall and end walls for retaining the said walls in an upright position and spaced apart relation.

6. A carton made from a single sheet blank of card or paper board material, comprising a panel forming the bottom of the carton, extensions from opposite sides of the bottom panel, each extension subdivided into sections by parallel score lines along which the sections are folded for erecting the same into a hollow wall of spaced inner and outer wall sections, an intermediate wall section joining said inner and outer wall section and forming the top for the wall, a flap section joining with the inner wall section and adapted to overlie the bottom panel, means for securing said flaps to the bottom panel with the score lines of said flaps with the inner wall sections spaced inwardly toward one another from the sides of the bottom panel a distance equal to the width of the intermediate wall section or carton wall top, whereby the said side walls of the carton may be assembled from a flat position to an upstanding position, tucking tabs at the opposite ends of the inner and outer side wall sections adapated to be disposed toward one another across the bottom panel, bendable flaps at the upper edges of certain of said tucking flaps, extensions at the remaining opposite sides of the bottom panel subdivided by parallel score lines into inner and outer end wall sections and an intermediate wall section, said inner and outer sections adapted to be folded on one another and around the tucking flaps with the bendable flaps of said tucking flaps extending parallel to the bottom panel and acting as reinforcing spacers for the inner and outer wall sections of the end walls, and co-operating means associated with said side and end walls for retaining same in an upright position.

7. A carton made from a single sheet blank of card or paper board material, comprising a panel forming the bottom of the carton, extensions from opposite sides of the bottom panel, each extension subdivided into sections by parallel score lines along which the sections are folded for erecting the same into a hollow wall of spaced inner and outer wall sections, an intermediate wall section joining said inner and outer wall sections and forming the top for the wall, a flap section joining with the inner wall section and adapted to overlie the bottom panel, means for securing said flaps to the bottom panel with the score lines of said flaps with the inner wall sections spaced inwardly toward one another from the sides of the bottom panel a distance equal to the width of the intermediate wall section or carton wall top, whereby the said side walls of the carton may be assembled from a flat position to an upstanding position, tucking flaps at the opposite ends of the inner and outer side wall sections adapted to extend toward one another when the side walls are in erected positions, a foldable flap on certain of said side wall tucking flaps, extensions at the remaining opposite sides of the bottom panel subdivided by parallel score lines into inner and outer end wall sections with a connecting top wall section therebetween, bendable flaps at opposite ends of one of said end wall sections, said end wall sections adapted to be folded on themselves around the tucking flaps, with the foldable flaps of said tucking flaps and the foldable flaps at the ends of the end wall sections extending between the inner and outer end wall sections for spacing said sections from one another, and means for retaining the end walls in an upright position.

8. A carton made from a single sheet blank of paper or card board material, comprising a panel forming the bottom of the carton, side walls integral with said bottom panel and extending from opposite sides of the bottom panel, extensions extending from the remaining ends of the panel subdivided into sections by parallel score lines to provide inner and outer wall sections with an intermediate top wall section therebetween, tucking flaps at the ends of the carton side walls, bendable tabs on the tucking flaps, bendable tabs at opposite ends of certain of the end wall sections, said end wall sections adapted to be folded on the score lines around the tucking flaps with the bendable flaps thereof extending between the inner and outer wall sections and with the bendable tabs at the ends of certain end wall sections likewise extending between the inner and outer end wall sections, said bendable tabs acting as spacers for the top and upright ends of the end wall sections, and means for securing these end walls in an upright position.

9. A carton made from a single sheet blank of paper or card board material, comprising a panel forming the bottom of the carton, side walls integral with said bottom panel and extending from opposite sides of the bottom panel, extensions extending from the remaining ends of the panel subdivided into sections by parallel score lines to provide inner and outer wall sections with an intermediate top wall section therebetween, tucking flaps at the ends of the carton side walls, bendable tabs on the tucking flaps, bendable tabs at opposite ends of certain of the end wall sections, said end wall sections adapted to be folded on the score lines around the tucking flaps with the bendable flaps thereof extending between the inner and outer wall sections and with the bendable tabs at the ends of certain end wall sections likewise extending between the inner and outer end wall sections, said bendable tabs acting as spacers for the top and upright ends of the end wall sections, means for securing these end walls in an upright position, and a tab at the ends of the bottom panel extensions adapted to overlie the bottom panel between the inner and outer wall sections and act as a spacer for the lower ends of said wall sections.

10. A box portion convertible from a flat position to an upstanding position and made from a blank comprising a bottom panel, an exterior side wall hinged thereto on a hinge fold line, a top wall hinged to the exterior side wall on a hinge fold line, an internal side wall hinged to the top wall on a hinge fold line, and the longitudinal edge of the latter side wall hingedly secured to the bottom panel along a longitudinal line spaced from the first side hinge fold line for a distance substantially equal to the width of the top wall, whereby a cushioning and insulating hollow wall is produced upon the setting up of same.

WILLIAM P. FRANKENSTEIN.

DISCLAIMER

Re. 21,158.—*William P. Frankenstein*, Cincinnati, Ohio. COLLAPSIBLE CARTON. Patent dated July 25, 1939. Disclaimer filed Feb. 21, 1946, by the patentee.

Hereby enters this disclaimer to claim 10 in said specification.

[*Official Gazette April 2, 1946.*]